United States Patent [19]

Wood

[11] Patent Number: 5,128,782
[45] Date of Patent: Jul. 7, 1992

[54] LIQUID CRYSTAL DISPLAY UNIT WHICH IS BACK-LIT WITH COLORED LIGHTS

[76] Inventor: Lawson A. Wood, 905 N. Frederick St., Arlington, Va. 22205

[21] Appl. No.: 521,399

[22] Filed: May 10, 1990

Related U.S. Application Data

[63] Continuation-in-part of Ser. No. 396,916, Aug. 22, 1989, abandoned.

[51] Int. Cl.$^5$ ............................................. G02F 1/13
[52] U.S. Cl. ........................................ 309/48; 359/54; 359/66; 359/73; 359/85; 340/784
[58] Field of Search .................... 350/345, 333, 339 F, 350/339 D, 331 R, 332 R, 339 R; 358/236, 237, 241; 340/784 G, 784 E, 784 A

[56] References Cited

U.S. PATENT DOCUMENTS

| | | | |
|---|---|---|---|
| 4,715,687 | 12/1987 | Glass et al. | 350/333 |
| 4,793,691 | 12/1988 | Enomoto et al. | 350/345 |
| 4,803,399 | 2/1989 | Ogawa et al. | 350/345 |
| 4,882,617 | 11/1989 | Vriens | 350/345 |
| 4,907,862 | 3/1990 | Suntola | 350/345 |
| 4,936,659 | 6/1990 | Anderson et al. | 350/345 |
| 4,973,137 | 11/1990 | Kozaki | 350/339 R |

FOREIGN PATENT DOCUMENTS

| | | | |
|---|---|---|---|
| 61-285429 | 12/1986 | Japan | 350/345 |
| 62-124526 | 6/1987 | Japan | 350/339 F |
| 63-68814 | 3/1988 | Japan | 350/345 |
| 63-82406 | 4/1988 | Japan | 350/339 D |

OTHER PUBLICATIONS

"Backlighting for Liquid Crystal Display", IBM Technical Disclosure Bulletin, vol. 29, No. 11, Apr. 1987.
McGraw-Hill Encyclopedia of Science & Technology, 6th ed., vol. 6 (1987) pp. 212-217.
McGraw-Hill Encyclopedia of Science & Technology, 6th ed., vol. 10 (1987) pp. 109-113.
McGraw-Hill Encyclopedia of Science & Technology, 6th ed., vol. 17 (1987) pp. 482-485.
J. Wilson et al., "Optoelectronics, An Introduction", 2nd ed. (1989) pp. 144-152.
Donald G. Fink et al., "Electronics Engineers' Handbook", 3rd ed. (1989) pp. (6-36), (11-9 and 11-10), (20-102 to 20-103), and (23-75 to 23-76).
T. D. Towers, "Electronics and the Photographer", Focal Press (1976) pp. 209-211.
Cannon, Inc. Leaflet for the "Spudlite 244T" flash unit (1982), 2 pages.

*Primary Examiner*—Rolf Hille
*Assistant Examiner*—Minhloan Tran
*Attorney, Agent, or Firm*—Spencer, Frank & Schneider

[57] ABSTRACT

A liquid crystal display unit includes a liquid crystal display panel having a matrix or pixels which act as light valves. The red component of an image is displayed on the panel, and a red light is flashed on the back of the panel. Then the green component of the image is displayed and a green light is flashed, and the blue component is displayed and a blue light is flashed. A plurality of light sources, each having a red light emitter, a green light emitter, and a blue light emitter, may be employed at a close distance to an active-matrix LCD panel if compensation is provided for the differences in light intensity at different positions on the back of the panel. A passive-matrix LCD panel may be used if a flash of light is emitted each time a row electrode of the panel is strobed. Preferably a plurality of light sources is used, and after one row electrode is strobed and its associated light source is fired, the next row electrode to be strobed is located adjacent a different light source. As a result, a row of pixels is exposed to an intense burst of light at the optimum moment and a relatively mild burst of light as the row of pixels is turning OFF.

31 Claims, 6 Drawing Sheets

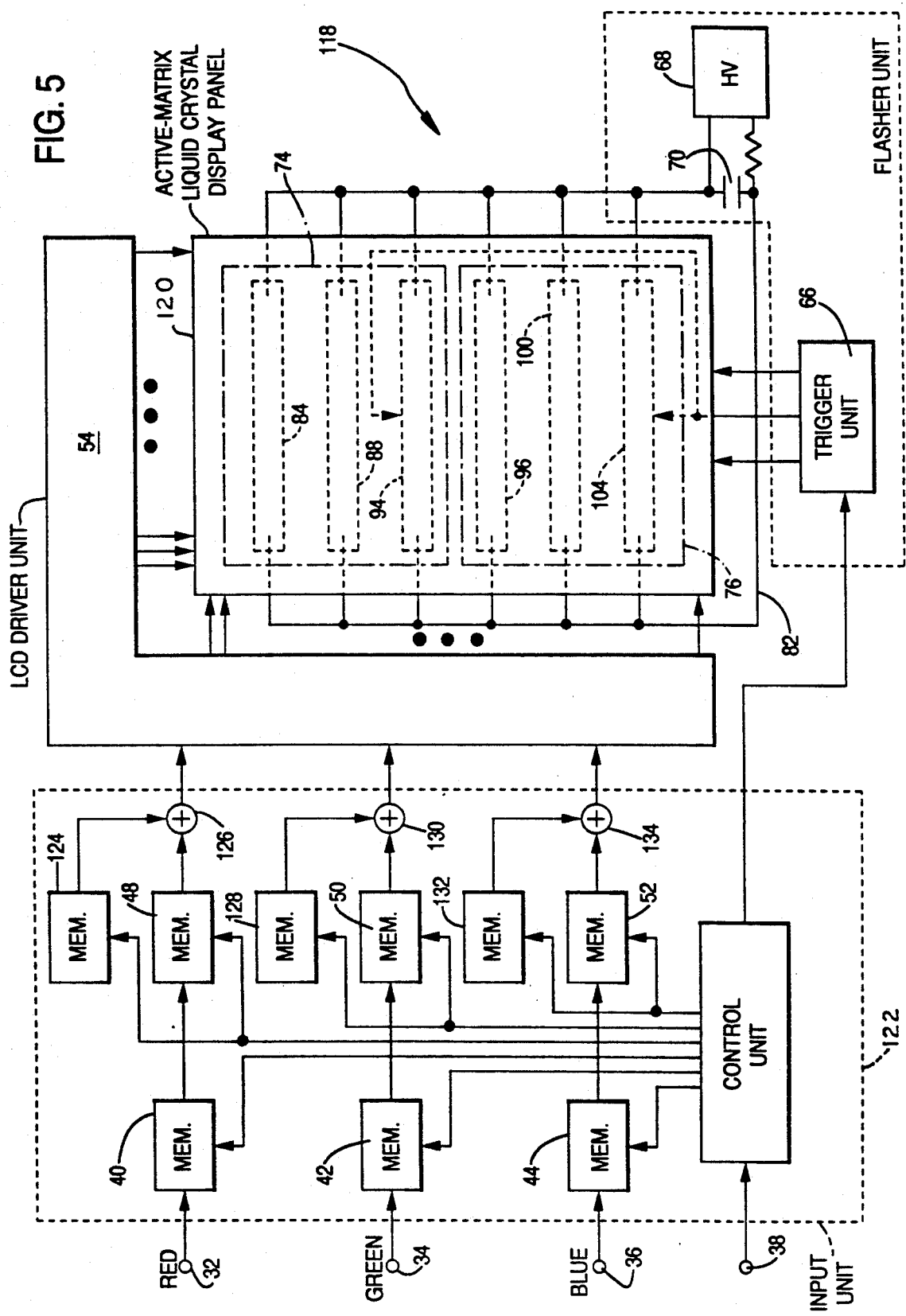

LIQUID CRYSTAL DISPLAY UNIT WHICH IS BACK-LIT WITH COLORED LIGHTS

CROSS-REFERENCE TO RELATED APPLICATION

This is a continuation-in-part of application Ser. No. 07/396,916, filed Aug. 22, 1989, now abandoned.

BACKGROUND OF THE INVENTION

The invention is directed to a liquid crystal display unit of the type having a matrix of pixels which can be individually controlled.

A liquid crystal is an organic fluid which, despite being a fluid, has molecules which spontaneously assume an ordered configuration. The configuration can be altered by applying an electric field, and the resulting change in the configuration of the molecules can be used to control light passing through the liquid crystal.

A class of liquid crystals known as nematic liquid crystals is frequently used for making electrical displays. The liquid crystal is sandwiched between two polarizers having transparent electrodes made, for example, from metal oxide film. The polarization axis of light passing through the first polarizer is rotated by the liquid crystal if no voltage is applied between the electrodes, and the degree of rotation decreases or disappears entirely when a voltage is applied. As a result, light passing through the first polarizer and the liquid crystal may or may not pass through the second polarizer depending upon the applied voltage and hence the polarization axis of the light when it reaches the second polarizer. The electrodes are normally patterned to provide individual regions which act as light valves. The individual regions may, for example, be configured to provide a seven-segment numerical display of the type frequently found in electrical watches. The voltages applied to various segments determine which segments are visible and thus which number appears.

The patterned electrode regions may also be disposed in a matrix which provides picture elements or pixels that can be individually controlled. Performance of the display panel can be improved by providing an amorphous MOS transistor for each pixel. Such display panels, with a transistor for each pixel, will be called "active-matrix" display panels in this application. An active matrix display panel is described, for example, in J. Wilson et al., "Optoelectronics, An Introduction" (1989) pages 144–152, or Donald G. Fink et al., "Electronics Engineers' Handbook," Third Edition (1989), pages 20–102 to 20–103. In contrast to active matrix display panels, LCD display panels without a transistor for each pixel will be called "passive-matrix" display panels in this application. The term "matrix-type" display panel, or simply "matrix" display panel, will be used generically to refer to either an active or a passive matrix panel.

Matrix-type liquid crystal display panels have been employed as television screens. In low-power designs, ambient light is reflected onto the back of the LCD panel. However, back-lighting with a white fluorescent lamp is frequently used. Furthermore, both modes of illumination may be provided so that the user can select the mode most appropriate to the viewing conditions. For example, the Seiko model "TFT" Pocket Color Television employs a back-light assembly which can be turned ON or OFF. The back-light assembly can be pivoted to a position directly behind the LCD panel when the back-lit mode is used, or it can be pivoted outward and used as a reflector of ambient light.

A matrix-type LCD panel basically provides a black-and-white display. However, it is known to convert this to a color display by attaching color filters to the LCD panel. One pixel is exposed through a red filter, an adjacent pixel is exposed through a green filter, and a third pixel adjacent the first two is exposed through a blue filter. As a result, the three adjacent mono-color pixels effectively provide a region in which the color can be controlled, this region encompassing the three pixels.

One difficulty with the conventional color LCD panel with mono-colored pixels, achieved with colored filters attached to the panel, is that resolution suffers. Each color-controllable region encompasses three pixels, and since the ultimate image is composed of such color-controllable regions the image is coarser than one would expect from a comparable black-and-white LCD panel having the same number of pixels.

SUMMARY OF THE INVENTION

Accordingly, an object of the invention is to provide a liquid crystal display unit for presenting color images with improved resolution.

Another object of the invention is to provide a liquid crystal display unit having reduced visual smear resulting from the inherent relatively slow response of liquid crystals to an applied electric field.

Another object of the invention is to provide techniques for exposing a liquid crystal display panel to light from colored sources located at different positions.

Another object of the invention is to provide a liquid crystal display unit which presents colored images of good contrast while using a passive-matrix LCD panel.

These and other objects which will become apparent in the ensuing detailed description can be attained by providing a liquid crystal display panel which is sequentially back-lit with light having different colors. For example, all of the pixels may be driven to display the red component of an image when a red light is flashed at the back of the panel, and the same for the blue and green components. Resolution is improved because the area needed to produce a range of colors is reduced from three pixels in the conventional device to a single pixel. Flash tubes are preferably used, rather than long-duration light sources, to avoid visual smear.

Short-duration light sources such as flash tubes can also be used with a passive-matrix LCD panel in order to concentrate the light into flashes which occur when a row of pixels is maximally transmissive. None of the light needed to attain the desired viewing brightness is emitted while a row of pixels is changing from an OFF state to a transmissive state, which would cause muddying of the visual image. Furthermore, the total light needed to achieve a desired viewing brightness is concentrated at periods when it is most useful (that is, energy is not wasted generating light in the interval between the maximally-transmissive state of one row of pixels and the maximally-transmissive state of another row of pixels), thus increasing energy efficiency. The inherent slowness of passive-matrix display panels can be countered by strobing the rows of pixels in a sequence such that each row of pixels that is strobed is spaced-apart from the row of pixels that was last strobed. With this technique, the inverse-square law can be invoked to reduce the amount of light reaching a row of pixels that has just been strobed as that row is returning to the OFF state.

The bursts of light may, for example, have a duration of less than about 0.001 seconds, or less than about 0.0001 seconds, or less than about 0.00001 seconds.

BRIEF DESCRIPTION OF THE DRAWINGS

FIG. 5 is a schematic block diagram illustrating a liquid crystal display unit which compensates for uneven light distribution without an intermediate LCD panel as in FIG. 4;

DESCRIPTION OF THE PREFERRED EMBODIMENTS

Figure 1:
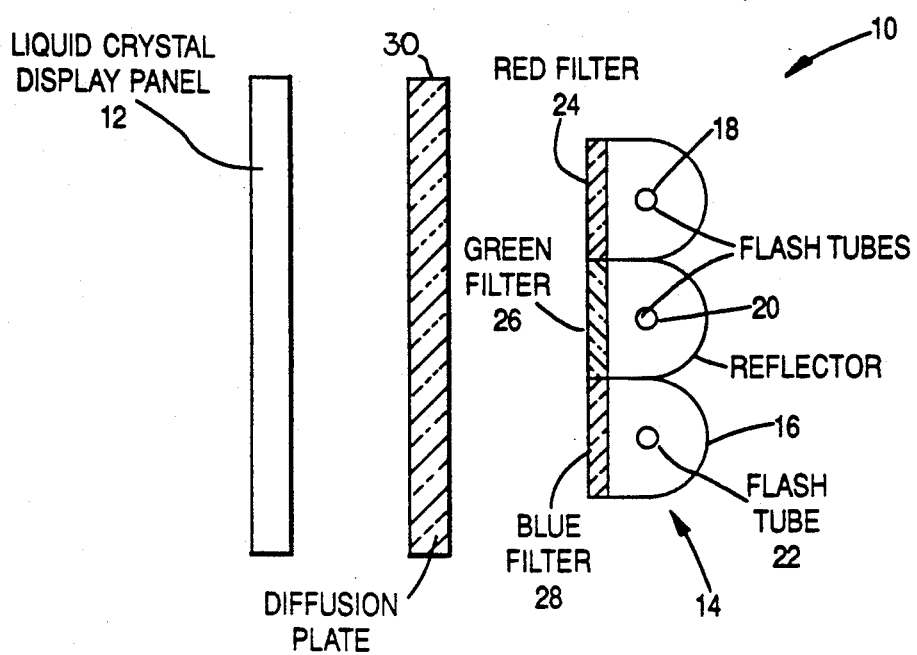
FIG. 1 is a top view, partially in section, schematically illustrating a liquid crystal display unit according to the present invention.

FIG. 1 schematically illustrates a liquid crystal display unit 10 according to the present invention. Unit 10 includes a conventional liquid crystal display panel 12 having a matrix of pixels for providing a black-and-white display. Behind panel 12 is a light source 14 for sequentially illuminating panel 12 with three primary colors. Light source 14 includes a reflector 16 and flash tubes 18, 20 and 22. Light source 14 also includes a red filter 24 in front of flash tube 18, a green filter 26 in front of flash tube 20, and a blue filter 28 in front of flash tube 22. Liquid crystal display unit 10 also includes a diffusion plate 30 between light source 14 and the back of panel 12. It will be apparent that the back of panel 12 is bathed with red light when flash tube 18 fires, with green light when flash tube 20 fires, and with blue light when flash tube 22 fires.

Figure 2:
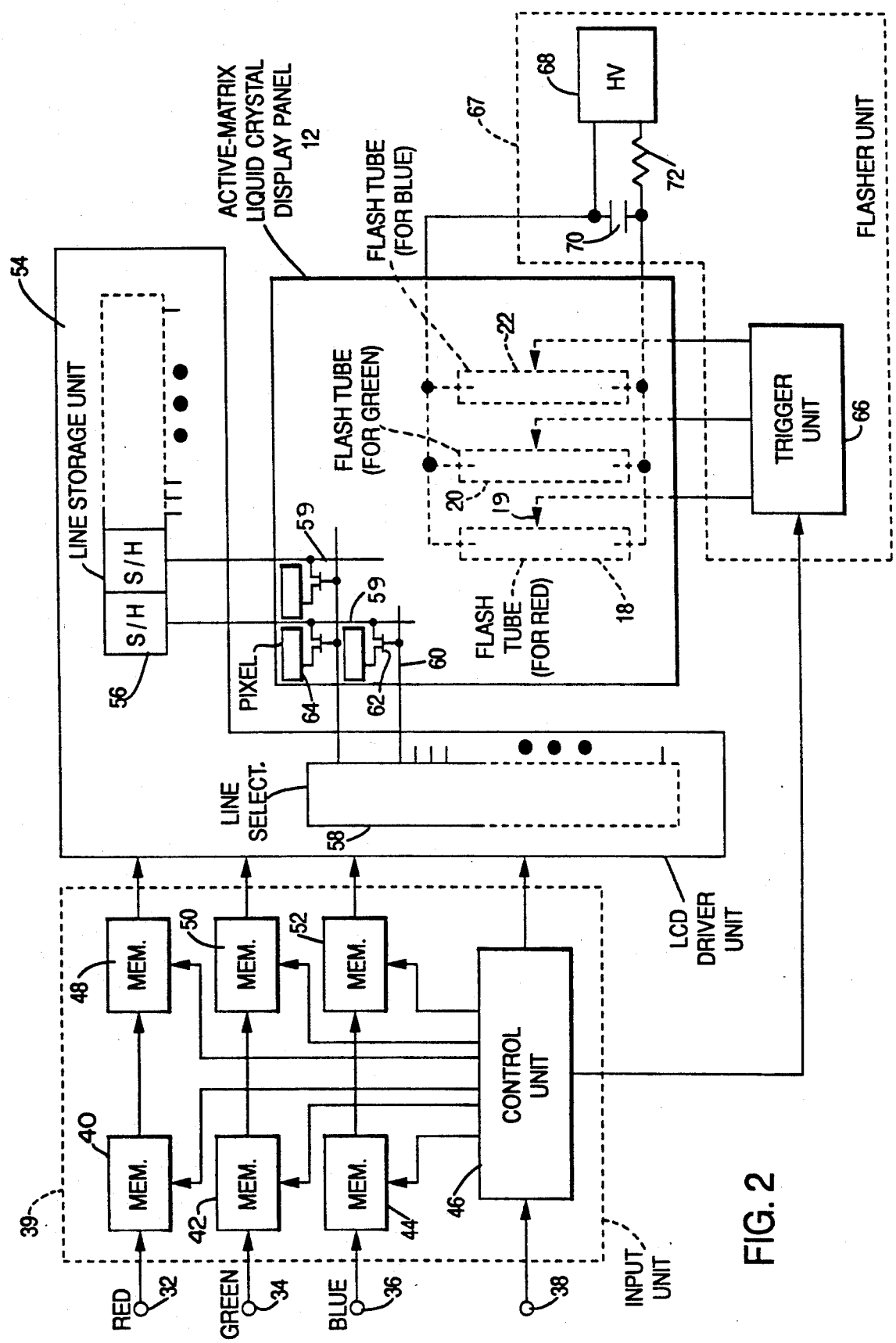
FIG. 2 is a schematic block diagram illustrating circuitry for driving the liquid crystal display unit of FIG. 1.

Turning next to FIG. 2, a digitalized red signal is applied to input port 32, a digitalized green signal is applied to input port 34, a digitalized blue signal is applied to input port 36, and a synchronization signal is applied to input port 38. These signals are conveyed to an input unit 39. The color signals are stored in respective frame memories 40, 42, and 44 under the control of a control unit 46. When a full frame is stored, control unit 46 transfers the contents of memories 40-44 to video memories 48-52, and then begins storing the next frame in memories 40-44. Control unit 46 also reads out the contents of memories 48-52 to an LCD driver unit 54, which includes a line storage unit 56 and a line selector 58.

Line storage unit 56 includes a plurality of sample and hold circuits which store analog values corresponding to the digital values read out of memory 48, memory 50, or memory 52. Each sample and hold circuit is connected to a column electrode 59 in panel 12. The three dots shown in FIG. 2 beneath line storage unit 56 are intended to indicate that unit 56 includes a large number of sample and hold circuits, more than just those shown. Similarly, panel 12 includes far more column electrodes 59 than are shown. Line selector 58 may be a shift register which applies a voltage sequentially to the row electrodes 60 of panel 12. Again, the use of three dots adjacent line selector 58 in FIG. 2 is intended to indicate that line selector 58 has far more stages, and panel 12 has far more row electrodes 60, than are shown.

The column and row electrodes 59 and 60 divide panel 12 into a matrix of cells. An amorphous MOS transistor 62 is provided in each cell, the gate of the transistor being connected to a row electrode 60 and the drain of the transistor being connected to a column electrode 59. The source is connected to a transparent electrode 64 which provides a controllable pixel for the respective cell. In practice the electrode 64 occupies most of the cell, the rest of which may have a coating to render it opaque. Since each pixel has a respective transistor it will be apparent that LCD panel 12 is an "active matrix" panel.

In operation, control unit 46 shifts a video line from memory 48 to LCD driver unit 54. The line is converted to analog and stored in the shift registers of line storage unit 56. Line selector 58 then strobes the uppermost row electrode 60, so that the contents the sample and hold circuits of line storage unit 56 control the transparency of the pixels in the top row of liquid crystal display panel 12. Control unit 46 then shifts the next video line from memory 48 to line storage unit 56, and line selector 58 strobes the second row electrode 60. Accordingly, the transparency of the second row of pixels in panel 12 corresponds to the second video line read out of memory 48. Since each LCD cell consumes very little current, and since the MOS transistors 62 have extremely high drain-to-source resistance when the transistors are off, the transparencies of the pixels in the top row remain substantially unchanged due to capacitive effects. This process continues row by row down LCD panel 12, using lines of video data sequentially read out of memory 48. As a result, when the last row electrode 60 has been strobed, the transparency of each pixel has been adjusted in accordance with the red frame read out of memory 48. After delaying a moment to allow the last row of pixels to settle, control unit 48 supplies a signal to trigger unit 66 of flasher unit 67, which in turn emits a signal to trigger terminal or electrode 19 of flash tube 18 in order to trigger flash tube 18.

A high voltage supply 68 charges a capacitor 70 through a resistor 72. The voltage across capacitor 70 is applied across flash tube 18, and when the trigger pulse arrives from unit 66 the tube 18 discharges with a brilliant and very short flash of white light. Due to red filter 24 (FIG. 1), a flash of red light floods the back of panel 12 and a bright, monochrome red image is momentary visible from the front surface of liquid crystal display panel 12.

After the red image has been displayed as discussed above, control unit 46 moves the first line of the green image from memory 50 to line storage unit 56, and the uppermost row electrode 60 is strobed. The process continues in the manner previously described until the entire green frame is read out of memory 50, whereupon flash tube 20 is triggered. The blue image is then read out of memory 52 and flash tube 22 is triggered.

Thereafter the red image for the next frame is read out of memory 48 and the cycle begins again.

It will be apparent from the foregoing discussion that each pixel acts as a light valve for all three primary colors. In contrast, in the conventional LCD color display unit each pixel is dedicated to a single color, and three adjacent pixels are needed to provide a region having a range of colors. Such three pixel regions represent what might be called super-pixels which decrease the resolution that can be attained. Additionally, the use of short-duration flashes rather than continuous illumination, as in conventional liquid crystal display units, reduces visual smear due to the relatively slow response inherent in liquid crystals.

It will be apparent to those skilled in the art that the invention is susceptible to various changes, modifications, and adaptations. In particular, the transistors 62 can be eliminated, so that a passive-matrix panel is employed rather than an active-matrix panel. In a conventional liquid crystal display panel, which is illuminated by a low-intensity but long-lasting light, elimination of the transistors 62 would produce a low-contrast display since only a small amount of light would flow through each pixel of a row when the corresponding row electrode 60 is strobed. However the appropriate flash tube 18, 20 or 22 of LCD unit 10 could be triggered each time a row electrode 60 is strobed, so that the storage effect provided by the transistors 62 is not essential for a high contrast image. Liquid crystal display units with passive-matrix display panels will be discussed in more detail below.

It will also be apparent that additional light sources 14 may be employed to reduce the demands on diffusion plate 30. For example, two or more light sources 14 could be employed side-by-side to smooth the illumination at the back of display panel 12. The use of additional light sources will also be discussed in more detail below.

Figure 3:
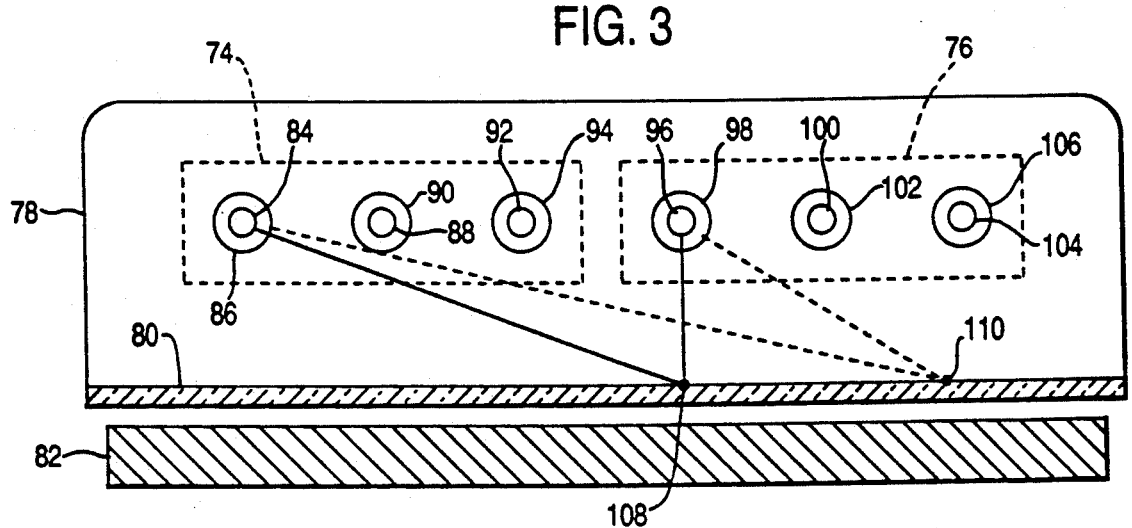
FIG. 3 is a sectional view illustrating two adjacent light sources, each having three color-filtered flash tubes, which emit light to an active-matrix LCD panel.

FIG. 3 will be used to illustrate a problem which arises when additional light sources are used with an active-matrix display panel at a position relatively close behind the panel.

In FIG. 3, a first light source 74 and a second light source 76 are disposed within a non-reflective housing 78 on which a diffusion plate 80 is mounted. An active matrix LCD display panel 82 is positioned beneath diffusion plate 80. Light source 74 includes a flash tube 84 within a red filter tube 86, a flash tube 88 within a green filter tube 90, and a flash tube 92 within a blue filter tube 94. Similarly, light source 76 includes a flash tube 96 within a red filter tube 98, a flash tube 100 within a green filter tube 102, and a flash tube 104 within a blue filter tube 106. The flash tubes 84, 88, 92, 96, 100, and 104 are evenly spaced.

According to the inverse-square law, the intensity of the radially emitted light falls off inversely with the distance from its source. At point 108 in FIG. 3, the distance to tube 84 is approximately three times the distance to tube 96. Accordingly, when flash tubes 84 and 96 are fired simultaneously at equal power levels, one unit (in some arbitrary measuring scheme) of light is received from flash tube 96 while only one-ninth of a unit is received from flash tube 84, for a total one and one-ninth units. However, the distance between flash tube 96 and point 110 is approximately twice the distance between flash tube 96 and point 108, so only one-fourth of a unit of light is received at point 110 from flash tube 96. Furthermore, the distance between flash tube 84 and point 110 is approximately four and one-half times the distance between flash tube 96 and point 108, so that only a twentieth of a unit of light is received at point 110 from flash tube 94. As a result, the total light received at point 110 from both flash tubes is only three tenths of a unit, or little more than a fourth of the light that is received at point 108. The matter is further complicated because, when flash tubes 88 and 100 are fired simultaneously at the same power level, less light will be received at point 108 from second light source 76 and more light will be received from first light source 74. At point 110, more light will be received from both light sources. In short, the patterns of light intensity on diffusion plate 80 shift depending upon whether a red flash, a green flash, or a blue flash is being emitted.

Figure 4:
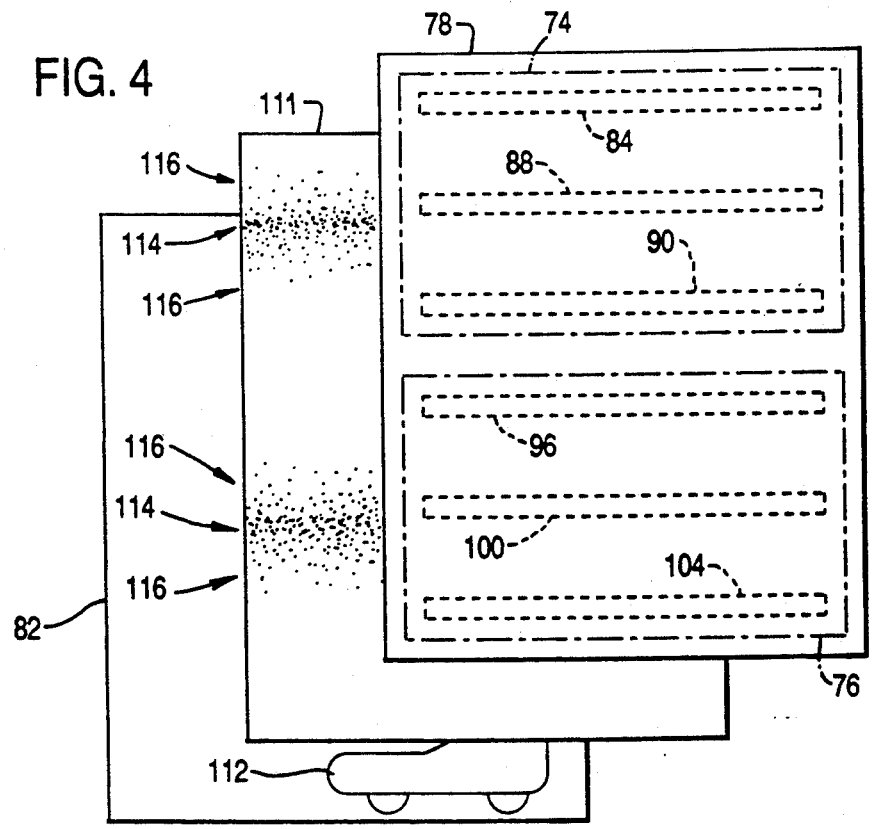
FIG. 4 is a perspective view schematically illustrating an intermediate LCD panel, between the light sources and the LCD panel of FIG. 2, which supplies shading to compensate for uneven light distribution.

A cure for this problem is illustrated conceptually in FIG. 4, in which diffusion plate 80 has been omitted for the sake of illustration. A compensation LCD display panel 111 is disposed between the panel 82 which displays the image 112 and the flash tubes. Panel 11 displays shading in bands which have regions 114 of greatest density located below the flash tubes that are firing and bands 116 of reduced density which are spaced-apart from the bands 114. It will be apparent that more bands are present than can be easily illustrated in FIG. 4, and that the density of the bands decreases as a function of the distance from the flash tube that is being fired. The net effect of compensation panel 111 is to reduce the effective intensity of the light closest to the tubes that are firing and thus smooth the illumination falling on diffusion plate 80 (FIG. 3). As a result, the radical changes in light intensity that were discussed above in conjunction with points 108 and 110 in FIG. 3 do not occur and, for a given distance between the flash tubes and panel 82, the illumination at the back of LCD panel 82 is more uniform. FIG. 4 illustrates a compensation LCD panel 111 instead of simply a translucent overlay with shading bands since the regions 11 of greatest density must be shifted depending upon which tubes are being fired.

Although one could implement the arrangement of FIG. 4 with a supplemental liquid crystal display unit as shown, FIG. 5 illustrates a liquid crystal display unit 118 which employs only one LCD display panel 120 (of the active-matrix type). Input unit 122 includes a shading memory 124 (a ROM) which supplies an appropriate density value each time a line of video information is read out of memory 48. These density values correspond to the shading bands shown in FIG. 4. The density value read out of memory 124 is added to the video information via adder 126 before the sum is conveyed to LCD driver unit 54. As a result, pixels in rows immediately beneath the flash tubes for red (flash tubes 84 and 96) are denser than pixels in rows which are further away by an amount sufficient to compensate for the relevant distances between the respective row and flash tubes 84 and 96. Similarly, a shading memory 128 (a ROM) provides density values which are added, by an adder 130, to the green information read from video memory 50, and a shading memory 132 (a ROM) and an adder 134 are provided for the blue component of the image to be displayed on panel 120.

Figure 6:
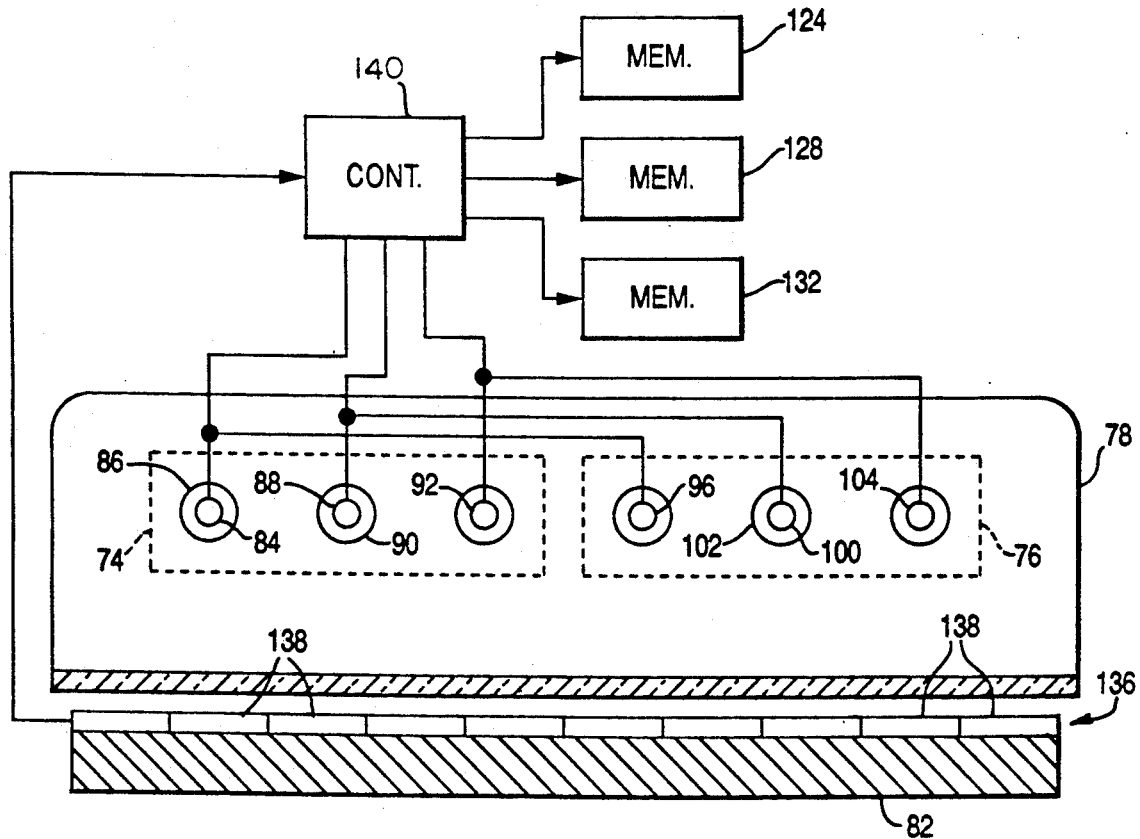
FIG. 6 schematically illustrates an apparatus for measuring the light distribution.

In FIG. 6, a sensor strip 136 having a large number of equally-spaced photosensors 138 (more photosensors 138 than are shown) is temporarily placed on display panel 82 and positioned so that strip 136 is perpendicular to the row electrodes (not illustrated, but corresponding to row electrodes 60 in FIG. 2). Signals from the photosensors 138 are conveyed to a controller 140, which fires tubes 84 and 96 in unison and stores values corresponding to the light intensity at different rows on panel 82 in shading memory 124. The higher the light intensity at a particular row (as detected by the appropriate photosensor 138), the greater the value for the shading density that is stored for that row in memory 124. Flash tubes 88 and 100 are then fired at equal power levels, and appropriate shading density values are stored in memory 128 for correcting the green component of the image. Shading density values for correcting the blue component of the image are then stored in memory 132.

It will be recalled that FIG. 3 was discussed earlier with the assumption that housing 78 is non-reflective. The reason for this assumption was that the inverse-square law was employed in the situation shown in FIG. 3, and this would not be true if a reflector were used. Instead, the light intensity would be a complicated function depending upon the configuration of the reflector and other parameters. However, in a practical embodiment it would be appropriate to use a reflective surface inside housing 78. Regardless of how the light intensity due to the flashing tubes might vary from row to row of display panel 82, by sensing and storing the actually-measured values the appropriate densities can be stored in memories 124, 128, and 132.

The embodiments of FIGS. 2 and 5 employ active-matrix LCD panels, which have the advantage of memory-like persistence of the light transmission values for a row of pixels after that row has been strobed. This advantage is coupled with a disadvantage, however, since large arrays of thin film, amorphous transistors are difficult to make. Passive-matrix LCD panels are considerably easier and thus less expensive to fabricate, since each pixel does not have its own transistor (that is, the transistors 62 shown in FIG. 2 are not employed in a passive-matrix LCD panel). As a result, a row of pixels in a passive-matrix LCD panel becomes transmissive only when that row is strobed by the line selector, and thereafter the row returns to an OFF state. Furthermore, the response is relatively slow. A row of pixels does not reach its maximally transmissive state (that is, the state determined by the values supplied by the line storage unit of the LCD driver unit) immediately when the strobe signal is generated, and moreover, the row of pixels is relatively slow in returning to the OFF state after the row has been strobed. The net result of these disadvantages, in traditional liquid crystal display units with passive-matrix panels, is that the image quality is degraded and the contrast is low. This is caused, inter alia, because light passes through a row of pixels only when the row is strobed, so the total quantity of light passing through the row for each multiplex cycle is relatively low. Furthermore, some of the light that passes through the row of pixels seeps through while the row is changing from the OFF state to the maximally transmissive state or when the row is returning from the maximally transmissive state to the OFF state. The light passing through a row of pixels as it is changing state is not fully modulated in accordance with values received from the line storage unit of the LCD driver unit. Finally, capacitive effects when adjacent row electrodes are strobed may also degrade image quality.

Figure 7:
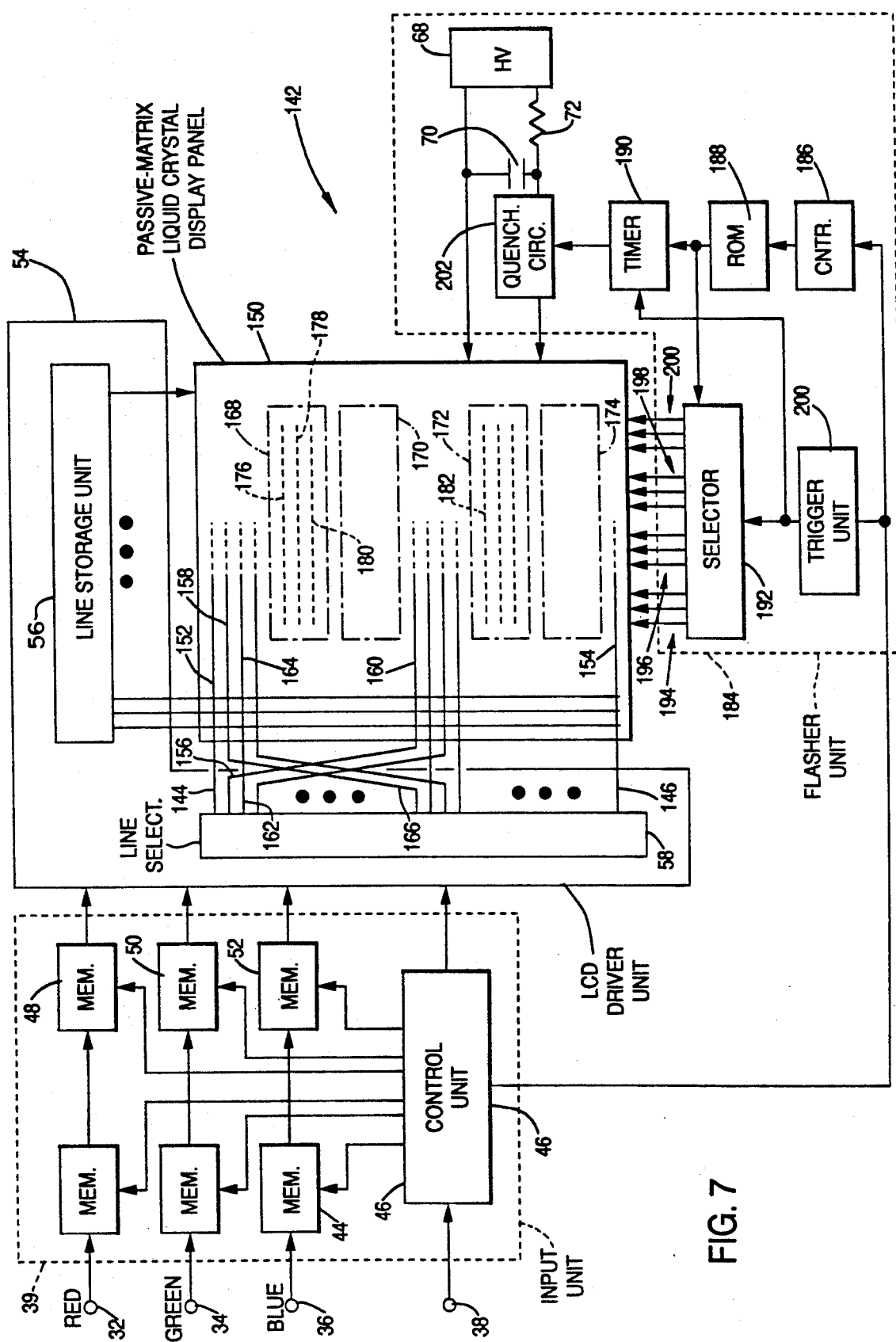
FIG. 7 is a schematic block diagram illustrating a liquid crystal display unit with a passive-matrix rather than an active-matrix LCD panel.

These traditional drawbacks of passive-matrix LCD panels are ameliorated in the liquid crystal display unit 142 shown in FIG. 7. Line selector 58 has a large number of output leads, from the first lead 144 to the last lead 146. Passive-matrix LCD panel 150 has the same number of row electrodes, from a first row electrode 152 to a last row electrode 154. The first output lead 144 is connected to the first row electrode 152. However, the second output lead 156 is not connected to the second row electrode 158, but instead to a row electrode 160 which is spaced a considerable distance from first row electrode 152. Third output lead 162 is connected to third row electrode 164, but the fourth output lead is connected to a row electrode adjacent electrode 160, and is thus spaced a considerable distance from third row electrode 164. As a result of this arrangement, row electrode 152 is strobed first, then row electrode 160, then row electrode 164, and so forth. It is not until output lead 166 becomes active that the second row electrode 158 is strobed. Control unit 46 reads lines of video information out of the appropriate memory (48, 50, or 52) in the same sequence that the row electrodes are strobed. The "criss-cross" pattern shown in FIG. 7 for the top half of panel 150 is repeated in the bottom half, although this is not specifically shown. The specific pattern of connections between the output leads and the row electrodes need not be as illustrated, so long as each row electrode that is strobed is adjacent a different light source (168, 170, 172, and 174) than the last row electrode that was strobed.

Light source 168 includes a filtered flash tube 176 for emitting red light, a filtered flash tube 178 for emitting green light, and a filtered flash tube 180 for emitting blue light. Light source 172 also includes three filtered flash tubes, although only the flash tube 182 for emitting red light bears a reference number. It will be understood that light source 170 also has three flash tubes with filters for emitting red, green, and blue light, as does light source 174, but these flash tubes are not illustrated in the drawing. It will also to be understood that the light sources 68-74 are depicted in FIG. 7 at positions that were selected for convenient illustration, and in reality they would be positioned so that the flash tubes are evenly spaced and so that the flash tubes extend at least the entire width of the panel 150 to avoid a light fall-off at the edges. It should be noted that the flash tubes are parallel to the row electrodes of panel 150.

Flasher unit 184 includes a counter 186 which receives a signal from input unit 39 each time a row electrode of panel 150 is to be strobed, the counter content being reset to zero when the last row electrode 154 is strobed for the last primary color flash. The counter content is used as an address signal for ROM 188. ROM 188 stores fire control words having two portions. The first portion of the fire control word identifies which flash tube is to be fired. For example, two bits of the first portion can be devoted to identifying which of light sources 168, 170, 172, and 174 is to be fired, and two bits can be used to encode the color of the flash (red, green, or blue) which is to be emitted from that light source. The second portion of the fire control word specifies how long the flash is to last. The second portion of the fire control word is supplied to a timer 190. The first portion of the fire control word is supplied to a flash tube selector 192, which has a set of three output lines 194 which are connected respectively to the trigger terminals (not illustrated) of flash tubes 176, 178, and 180 in light assembly 168. Another set of output lines 196 is connected to the trigger terminals (not illustrated) of the flash tubes (not illustrated) in light assembly 170.

Similarly, a set of output lines 198 conveys signals for triggering the flash tubes of light assembly 172, while a set of output lines 200 conveys signals for triggering the flash tubes (not illustrated) of light assembly 174.

Input unit 39 emits a signal to flasher unit 184 when it is time for line selector 58 to actuate the next output lead, thus strobing a row electrode of panel 150 (alternatively, the signal to flasher unit 184 could be derived from line selector 58 itself, by OR-ing all of its output leads and by clearing counter 186 every third time the last output lead 146 is actuated). The input signal received by flasher unit 184 is delayed slightly by trigger unit 200 to permit the pixels of the strobed row electrode to become maximally transmissive and reach the light-transmission values established by the signals from line storage unit 56 (or to rise to a predetermined percentage of maximally transmissive if increased speed is needed). Furthermore, the content of counter 186 is incremented by the input signal, and a fire control word is read out of ROM 188. Selector 192 receives the first portion of the read-out word and passes the delayed output signal from trigger unit 200 to the appropriate one of the output lines 194, 196, 198, and 200, thus causing the selected flash tube to fire. The output signal from trigger unit 200 is also supplied to timer 190, which thereupon begins timing an interval having a duration specified by the second part of the fire control word. Quenching circuit 202 discontinues the discharge of capacitor 70 after the time interval elapses, thus extinguishing the flash.

The duration of a flash is selected so that, for each color, the light reaching a row of pixels is independent of the position of that row in panel 150. When a row of pixels at point 108 in FIG. 3 is to be illuminated by a pulse of red from flash tube 96, for example, the duration will be shorter than would be necessary if the row of pixels were positioned at point 110. The duration values to be stored in ROM 188 can be obtained with an apparatus along the lines of that shown in FIG. 6. The pixels in a particular row are driven so as to be as transmissive as possible, and then a selected one of the red, green, or blue flash tubes that is nearest the particular row of pixels is fired. The light received by a photosensor 138 beneath the row of pixels is integrated until it reaches a reference value, and the time it takes for this to occur establishes the value to be stored in ROM 188 (FIG. 7) for that particular row when it is illuminated by a flash of that particular color. For each color the reference value is the same for all the rows, so the illumination of a row of pixels is independent of its position in panel 150.

An example of the operation of liquid crystal display unit 142 will now be provided.

Assume that row electrode 146 has just been strobed for a blue flash, and it is now time to display the red component of a new frame received from video memory 48. The first line of the new frame is transferred to line storage unit 56 and the first row electrode 152 is strobed. Counter 186, which was reset to zero when row electrode 146 was strobed to complete the last (blue) image, is incremented and provides an address signal of 00 . . . 001 to ROM 188. The first portion of the fire control word stored at this address identifies flash tube 176, which is fired when trigger unit 200 emits its signal. Timer 190 causes quenching circuit 202 to discontinue the discharge after an interval set by the second portion of the fire control word. Then the next line of video information is transferred from memory 48 to line storage unit 56. This next line of video information is not the second line of the image itself, but the line which corresponds to row electrode 160. The fire control word at address 00 . . . 002 is read out of ROM 188. The fire control word specifies flash tube 182, which is thereupon flashed for the period set by the second portion of the fire control word. The third line of video information to be read out of video memory 48 is the third line of the image itself. This line of video information is transferred to line storage unit 56, and the third row electrode 164 is strobed. The third fire control word read out of ROM 188 specifies flash tube 176, and the duration set by the second portion of this fire control word may be virtually the same as the duration when first row electrode 152 was strobed, since the first and third rows are very close, or it may be slightly different. This process continues until all of the lines of video information for the red component of the image have been displayed, and then the blue and green components are displayed.

Liquid crystal display unit 142 has distinct advantages over conventional units employing passive-matrix LCD panels. In unit 142, all of the light which is to reach a viewer through a particular row of pixels is generated when the pixels of that row are maximally transmissive and are thus displaying that image line to the sharpest extent. Since the response of liquid crystals is relatively slow one could elect to illuminate the rows of pixels before they have completely settled in order to reduce the time required to display an image and thus permit large units to be operated without flicker, but even with such a tradeoff all of the light would emitted at the best moment. Another advantage is that a row of pixels which has just been strobed is relatively distant from the next flash tube to be flashed. Thus the light intensity at a row of pixels that is returning to the OFF state after having been strobed is effectively reduced.

In the embodiment of FIG. 7, the quantity of light emitted during a flash is determined by controlling the duration of the flash (it is noted that flash duration in the photographic arts has been controlled in accordance with the light reflected from the subject; see T.D. Towers, "Electronics and the Photographer," Focal Press (1976), pp. 209-211). Another way to control the total light during a flash would be to control the energy stored on capacitor 70. This could be done by using a controllable-voltage power supply (not illustrated) in lieu of supply 68. Timer 190 would be replaced by an A/D converter (not illustrated) which receives a power level stored in ROM 188 an which provides an output signal to control the voltage of the power supply charging capacitor 70. The higher the voltage, the more energy stored, the brighter the flash. Quenching circuit 202 or its equivalent would not be needed.

Figure 8:
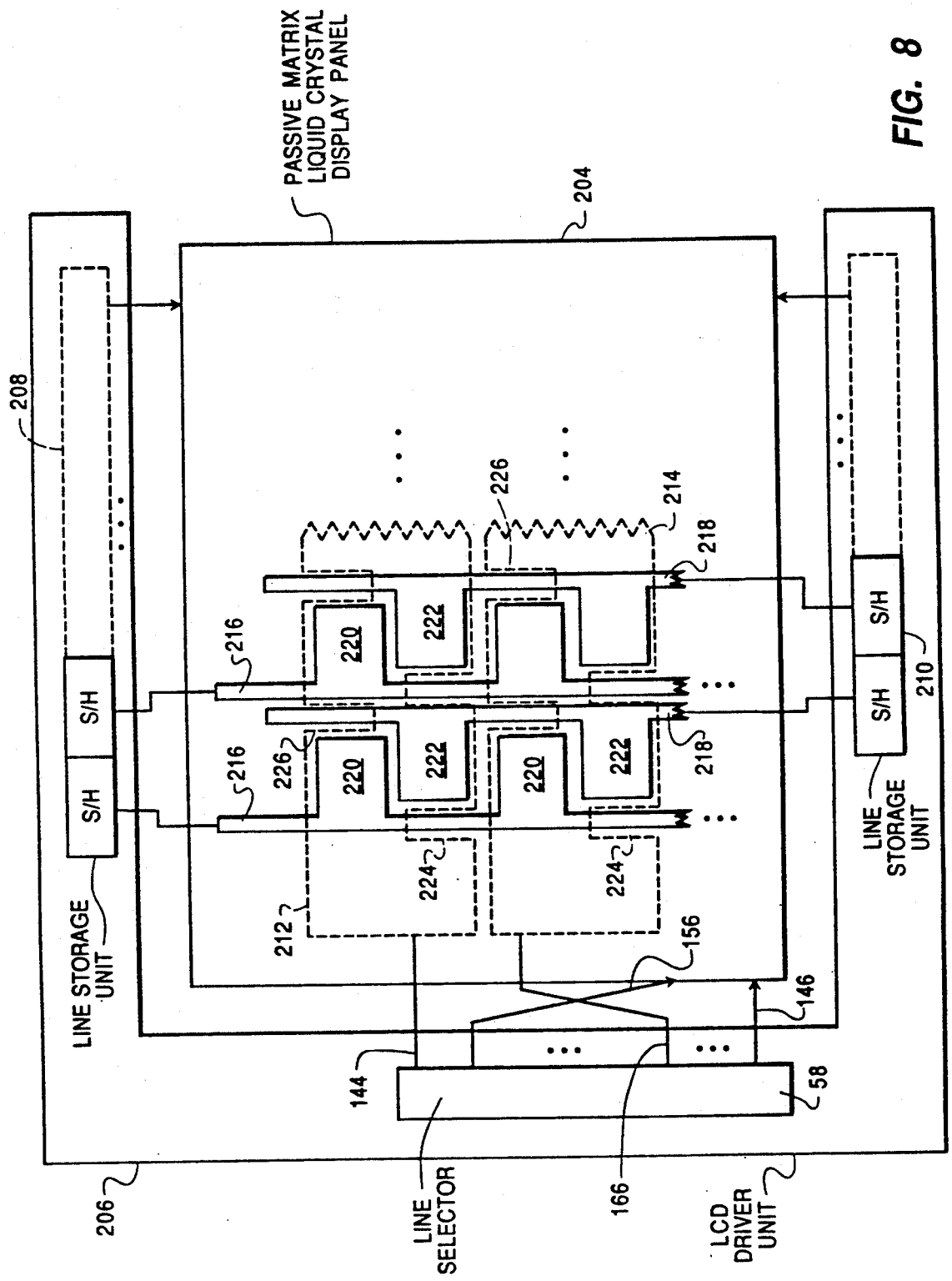
FIG. 8 is a top view illustrating a modified passive-matrix LCD panel and a modified LCD driver unit for use in the liquid crystal display unit of FIG. 7.

FIG. 8 shows a passive-matrix LCD panel 204 and an LCD driver unit 206 that could be used in lieu of the panel 150 and LCD driver unit 54 in the embodiment of FIG. 7. LCD driver unit 206 has two line storage units, bearing reference numbers 208 and 210, in addition to line selector 58. Line storage units 208 and 210 receive adjacent lines of video information simultaneously. For example, line storage units 208 and 210 respectively store video information corresponding to the first and second lines of the image itself when output line 144 of line selector 58 is activated to strobe row electrode 212. When output line 166 is activated to strobe row electrode 214, line storage units 208 and 210 might respectively store video information corresponding to the ninety ninth and one hundredth lines of the image itself.

Column electrodes 216 are connected to the sample-and-hold units of line storage unit 208, while column electrodes 218 are connected to the sample-and-hold units of line storage unit 210. Column electrodes 216 include lobes 220 which are interleaved with the lobes 222 of column electrodes 218. Each column electrode 216 and each column electrode 218 has a lobe over each row electrode. As a result, two rows of pixels are displayed each time a row electrode is strobed. The row electrodes themselves may have notches 224 to avoid displaying the signals from line storage unit 208 at the bottom halves of the row electrodes, and notches 226 to avoid displaying the signals from line storage unit 210 at the top halves of the row electrodes. Alternatively, an opaque mask pattern (not illustrated) could be used.

Displaying two rows of pixels each time a row electrode is strobed has two distinct advantages. First, energy is conserved, since two rows of pixels rather than one are displayed each time a flash tube is triggered. More importantly, the time permitted for a row of pixels to reach its maximally transmissive state before a flash and then return to the OFF state prior to the next flash is effectively increased, since flashes are needed only half as often for a given number of pixel rows in a panel.

Flash tubes have been used in the embodiments described herein not only because they are easy to control, but also because they emit very short flashes of very bright light. However, other light emitters could be used if they are bright enough and brief enough. In particular, florescent tubes which generate ultraviolet light that excites phosphors coating the interiors of the tubes may be employed in some applications. The advantage would be that the phosphors of each tube would emit either red, green, or blue light, so that colored filters would be unnecessary.

It will be understood that the above description of the present invention is susceptible to various modifications, changes, and adaptations, and the same are intended to be comprehended within the meaning and range of equivalents of the appended claims.

What I claim is:

1. A display unit, comprising:
a panel having a matrix of light valves which provide pixels for displaying an image, the panel additionally having a back side; and
means for exposing the back side of the panel to light having a first color, to light having a second color, and to light having a third color,
wherein the means for exposing includes a first flash tube with a trigger terminal, a second flash tube with a trigger terminal, and a third flash tube with a trigger terminal, the means for exposing additionally including means for establishing a potential difference across the flash tubes, and means connected to the trigger terminals for triggering one of the first, second, and third flash tubes at a time, and wherein each burst of light has a duration of less than about 0.0001 second.

2. The display unit of claim 1, wherein each burst of light has a duration of less than about 0.00001 second.

3. The display unit of claim 1, wherein the means for exposing further comprises first filter means for filtering light generated by the first flash tube, second filter means for filtering light generated by the second flash tube, and third filter means for filtering light generated by the third flash tube, the first, second, and third filter means having different colors.

4. The display unit of claim 3, further comprising means disposed between the back side of the panel and the first, second, and third filter means for diffusing light.

5. The display unit of claim 3, wherein the first, second, and third filter means comprise first, second, and third filter tubes which are disposed around the first, second, and third flash tubes, respectively.

6. The display unit of claim 1, wherein the panel is an active-matrix LCD panel.

7. The display unit of claim 1, wherein the panel is a passive-matrix LCD panel.

8. A liquid crystal display unit, comprising:
a passive-matrix liquid crystal display panel having a matrix of light valves which provides pixels for displaying an image, the panel additionally having a back side and a plurality of row electrodes;
means for strobing the row electrodes of the display panel in a predetermined sequence; and
means for exposing the back side of the panel to a short duration burst of light each time a row electrode of the display panel is strobed.

9. The liquid crystal display unit of claim 8, wherein the means for exposing comprises at least one first flash tube, first filter means for transmitting only light of a first primary color from the at least one first flash tube, at least one second flash tube, second filter means for transmitting only light of a second primary color from the at least one second flash tube, at least third flash tube, and third filter means for transmitting only light of a third primary color from the at least one third flash tube, and further comprising means for diffusing the light of the three primary colors before the light of the three primary colors reaches the back side of the panel.

10. The liquid crystal display unit of claim 8, wherein the means for exposing comprises a plurality of illuminating means disposed at different positions behind the display panel, and means for actuating the illuminating means in a predetermined sequence, and wherein the predetermined sequence in which the row electrodes are strobed by the means for strobing in such that each row electrode that is strobed is spaced apart by a plurality of intervening row electrodes from the last row electrode that was strobed.

11. A display unit, comprising:
a panel having a matrix of light valves which provide pixels for displaying an image, the panel having a back side;
means for exposing the back side of the panel to short duration bursts of light, the light of each burst varying in intensity in a plane parallel to the back side of the panel; and
means for electronically compensating for the varying light intensity in the plane.

12. The display unit of claim 11, wherein the means for exposing comprises a light source having first illuminating means for generating short duration bursts of light having a first color, second illuminating means for generating short duration bursts of light having a second color, and third illuminating means for generating short duration bursts of light having a third color, the back side of the panel being exposed to light of only one color at a time.

13. The display unit of claim 12, wherein the first illuminating means comprises a flash tube having a trigger terminal, wherein the second illuminating means comprises another flash tube having a trigger terminal, and wherein the third illuminating means comprises an additional flash tube having a trigger terminal.

14. The display unit of claim 12, wherein the means for exposing further comprises at least one additional light source having first, second, and third additional illuminating means for respectively generating short duration bursts of light having the first color, the second color, and the third color.

15. The display unit of claim 14, wherein the means for electronically compensating comprises means for controlling the density of the pixels depending at least in part on whether a burst of light has the first color, the second color, or the third color.

16. The display unit of claim 11, wherein the means for electronically compensating comprises means for controlling the density of the pixels.

17. The display unit of claim 11, wherein the light valves are liquid crystal light valves, and the panel is an active-matrix LCD panel.

18. A display unit, comprising:
a panel having a plurality of row electrodes and having a matrix of light valves which provide pixels for displaying an image, the light valves being normally closed and being disposed in rows cooperating with the row electrodes so as to permit display of corresponding lines of the image when respective row electrodes are strobed, at least one row of light valves being aligned with each row electrode, the panel additionally having a back side;
means for conveying video information to the panel, the means for conveying including means for strobing the row electrodes in a predetermined sequence; and
means for exposing the back side of the panel to a short duration burst of light each time a row electrode is strobed.

19. The display unit of claim 18, wherein the means for exposing comprises a light source having first illuminating means for generating short duration bursts of light having a first color, second illuminating means for generating short duration bursts of light having a second color, and third illuminating means for generating short duration bursts of light having a third color, the back side of the panel being exposed to light of only one color at a time.

20. The display unit of claim 19, wherein the first illuminating means comprises a flash tube having a trigger terminal, wherein the second illuminating means comprise another flash tube having a trigger terminal, and wherein the third illuminating means comprises an additional flash tube having a trigger terminal.

21. The display unit of claim 19, wherein the predetermined sequence of strobing the row electrodes is such that each row electrode that is strobed is spaced apart by a plurality of intervening row electrodes from the immediately preceding row electrode that was strobed.

22. The display unit of claim 19, wherein the means for exposing further comprises at least one additional light source having first, second, and third additional illuminating means for respectively generating short duration bursts of light having the first color, the second color, and the third color, and wherein the predetermined sequence of strobing the row electrodes is such that each row electrode that is strobed is spaced apart by a plurality of intervening row electrodes from the immediately preceding row electrode that was strobed, each at least one row of light valves that is aligned with a row electrode that is strobed receiving a burst of light from a different light source than the light source that emitted the immediately preceding burst of light.

23. The display unit of claim 22, wherein the means for exposing further comprises means for controlling the total amount of light emitted during a burst as a function of a distance between a row electrode that is strobed and the illuminating means that emits a burst of light to expose the at least one row of light valves aligned with that row electrode.

24. The display unit of claim 23, wherein the means for controlling comprises a memory which stores valves which determine the total amount of light to be emitted during a burst.

25. The display unit of claim 23, wherein the means for controlling comprises a memory which stores valves determining the total amount of light to be emitted during a burst and determining which illuminating means is to emit the burst.

26. The display unit of claim 18, wherein the predetermined sequence of strobing the row electrodes is such that each row electrode that is strobed is spaced apart by a plurality of intervening row electrodes from the immediately preceding row electrode that was strobed, and wherein the means for exposing comprises a light source having illuminating means for generating short duration bursts of light and means for controlling the total amount of light emitted during a burst as a function of a distance between a row electrode that is strobed and the illuminating means.

27. The display unit of claim 26, wherein the light valves are liquid crystal light valves, wherein the panel is a passive-matrix LCD panel which includes a plurality of first column electrodes that traverse the row electrodes, and a plurality of second column electrodes that traverse the row electrodes, each first column electrode having lobes positioned at each row electrode and each second column electrode having lobes positioned at each row electrode, and wherein the means for conveying video information comprises LCD driver unit means for strobing the row electrodes and for displaying a plurality of image lines each time a row electrode is strobed, the LCD driver unit means including a first line storage unit which holds a first line of video information and which is connected to the first column electrodes and a second line storage unit which holds an adjacent second line of video information and which is connected to the second column electrodes.

28. The display unit of claim 18, wherein the light valves are liquid crystal light valves, and the panel is a passive-matrix LCD panel.

29. The display unit of claim 28, wherein the passive-matrix LCD column includes column electrodes, the column electrodes having interleaved lobes, the lobes being disposed with respect to the row electrodes in such a manner that more than one row of pixels is actuated each time a row electrode is strobed.

30. A liquid crystal display unit, comprising:
a liquid crystal display panel having a plurality of row electrodes, a plurality of first column electrodes which traverse the row electrodes, and a plurality of second column electrodes which traverse the row electrodes, each first column electrode having lobes positioned at each row electrode and each second column electrode having lobes positioned at each row electrode; and LCD driver unit means for strobing the row electrodes in a predetermined sequence and for displaying a plurality of image lines each time a row electrode is strobed, the LCD driver unit means including a first line storage unit which holds a first line of video information and which is connected to the first column electrodes and a second line storage unit which holds an adjacent second line of video information and which is connected to the second column electrodes.

31. The liquid crystal display unit of claim 30, wherein the liquid crystal display panel is a passive-matrix panel having a back side, wherein the predetermined sequence in which the row electrodes are strobed is such that each row electrode that is strobed is spaced apart by a plurality of intervening row electrodes from the last row electrode that was strobed, and further comprising means for exposing the back side of the panel to a short duration burst of light each time a row electrode is strobed, the means for exposing including a plurality of illuminating means that are not all activated at once.

* * * * *